(12) United States Patent
Belqasmi et al.

(10) Patent No.: US 8,005,015 B2
(45) Date of Patent: Aug. 23, 2011

(54) SIGNALING FRAMEWORK FOR NEGOTIATING AND EXECUTING COMPOSITION OF REGISTRIES

(75) Inventors: Fatna Belqasmi, Montreal (CA); Roch Glitho, Saint-Laurent (CA); Rachida Dssouli, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 215 days.

(21) Appl. No.: 12/180,894

(22) Filed: Jul. 28, 2008

(65) Prior Publication Data

US 2010/0020720 A1 Jan. 28, 2010

(51) Int. Cl.
H04L 12/28 (2006.01)
(52) U.S. Cl. .................................. 370/254; 370/389
(58) Field of Classification Search .................. 370/254, 370/389, 392, 400, 401
See application file for complete search history.

(56) References Cited

U.S. PATENT DOCUMENTS

| | | | |
|---|---|---|---|
| 2003/0065774 A1* | 4/2003 | Steiner et al. | 709/225 |
| 2005/0157660 A1* | 7/2005 | Mandato et al. | 370/254 |
| 2005/0198351 A1* | 9/2005 | Nog et al. | 709/232 |
| 2007/0025363 A1* | 2/2007 | Zhang | 370/400 |
| 2007/0192326 A1* | 8/2007 | Angal et al. | 707/10 |
| 2008/0133727 A1 | 6/2008 | Belqasmi et al. | |
| 2008/0198822 A1* | 8/2008 | Magnusson et al. | 370/338 |
| 2009/0207840 A1* | 8/2009 | Mccanne | 370/390 |

OTHER PUBLICATIONS

Fatna Belqasmi et al.: "Data Inter-Working Aspect of Network Cooperation in 4G: The Case of Registry Composition in Ambient Networks"; Network Operations and Management Symposium Workshops, 2008; IEEE, Piscataway, NJ, USA, Apr. 7, 2008; 6 pages, XP031247418.
Fatna Belqasmi et al.: "An Overlay Architecture for Information Publication and Discovery After the Composition of Registries in Ambient Networks"; Consumer Communications and Networking Conference, 2007; IEEE, PI, Jan. 1, 2007; pp. 105-109, XP031087759.
Rody Kersten: The Composition Agreement in Ambient Networks, Dec. 1, 2006; 30 pages, XP002559695.
International Search Report for PCT/IB2009/053250, mailing date of Dec. 22, 2009; 7 pages.
Belqasmi, Fatna et al.: "A Signaling Framework for Registry Composition in Ambient Networks", IEEE Transactions on Journal Name, Manuscript ID, published on Jul. 4, 2007, 12 pages.
Johnsson, Martin et al.: Wireless World—Research Forum, "Network Composition"; Nov. 22, 2005; 10 pages.

* cited by examiner

*Primary Examiner* — Hassan Phillips
*Assistant Examiner* — Saba Tsegaye
(74) *Attorney, Agent, or Firm* — Alex Nicolaescu; Ericsson Canada Inc.

(57) ABSTRACT

Systems, methods, devices and software for negotiating and executing registry composition are described. Signaling frameworks for both of these aspects of registry composition are provided.

14 Claims, 16 Drawing Sheets

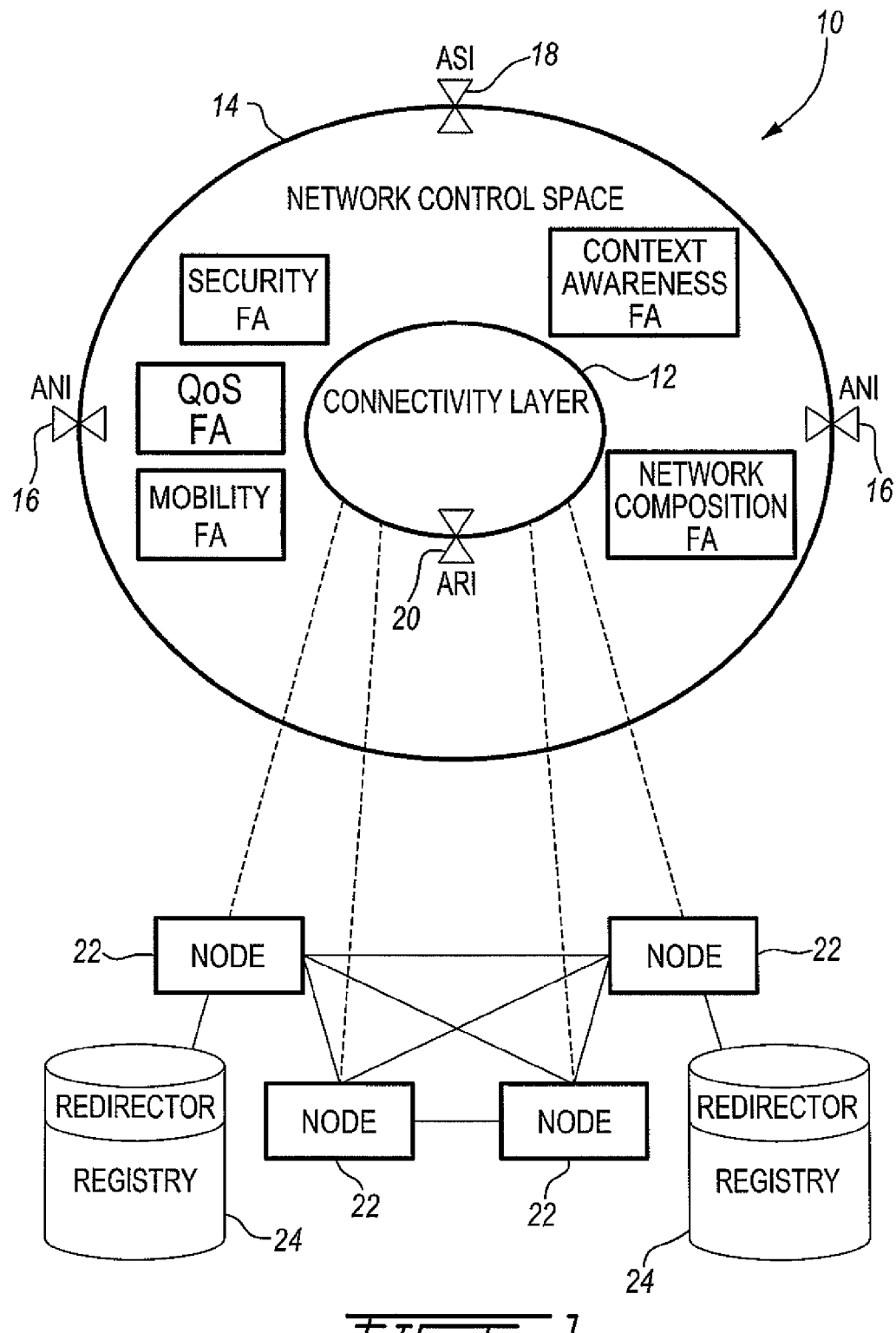

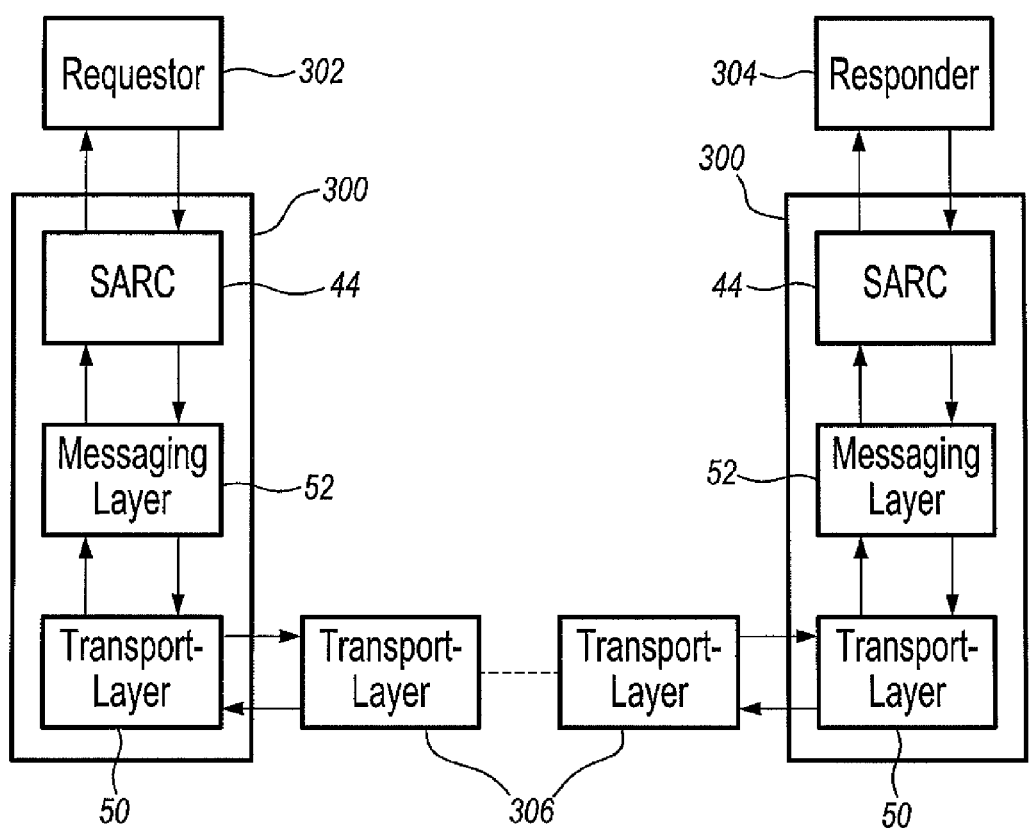

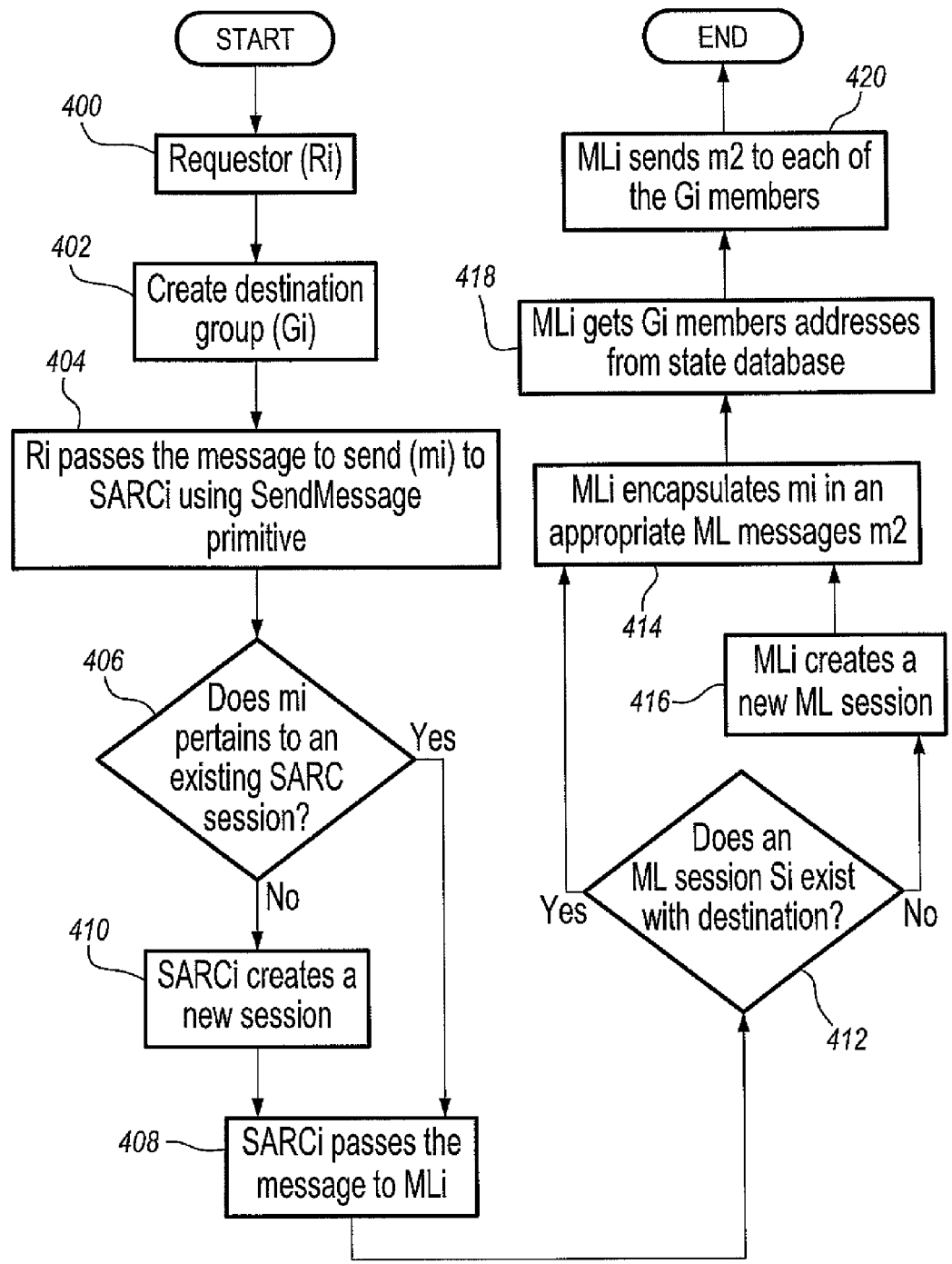

FIG_6

SIGNALING FRAMEWORK FOR NEGOTIATING AND EXECUTING COMPOSITION OF REGISTRIES

TECHNICAL FIELD

The present invention relates generally to automatic composition of networks and, more particularly, to methods, systems, devices and software for performing signaling associated with composing registries and other information associated with network composition.

BACKGROUND

In the near future, consumers are expected to carry multiple devices that communicate with one another to form small, personal area networks (PANs) that move with the user. In a given area, there may be many users, each with his/her own PAN. The PANs of different users are likely to comprise different devices, use different technologies, and have different resources and capabilities. It would benefit users to make the resources and capabilities of one PAN available to other PANs. For example, one PAN may have Internet access that can be shared with other PANs.

Network interworking allows the sharing of resources between networks so that users in one network can have access to resources in another network. BLUETOOTH and IEEE 802.15 both allow interworking between PANs. However, such interworking typically requires manual configuration and off-line negotiation.

The concept of network composition is gaining acceptance as a viable technique for the seamless and automatic creation of ad-hoc networks without user intervention. Automatic network composition enables interworking between networks "on the fly" in a manner that is transparent to the user. For example, the Ambient Networks Project is currently developing standards for networks called Ambient Networks. An Ambient Network (AN) can be defined as one or more network nodes and/or devices that share a common network control plane called the Ambient Control Space (ACS). The ACS contains all of the network control and management functions, which are organized into functional areas (FAs). Each FA represents a different management task (e.g., QoS, mobility, composition, security, congestion control, etc.). The ACS includes two interfaces: the Ambient Network Interface (ANI) and the Ambient Service Interface (ASI). The ANI enables communication between different Ambient Networks, and the ASI allows access to the services offered by the Ambient Network. The ACS enables automatic composition of networks in a transparent fashion, without manual configuration and off-line negotiation, while taking into account user needs, preferences, locations, and devices.

ANs can host several registries. A registry is any authoritative store of information or repository of data. Examples include Management Information Bases (MIB), relational databases and Context Information Bases (CIB). When ANs compose, the hosted registries need to compose. Registry composition is a sub-process of network composition and provides seamless, autonomous and uniform access to the updated content of all of the registries in the composed network. There are several reasons for performing registry composition. A first reason is that the registries' content may need to compose. Indeed, when ANs compose, the content of the hosted registries may be kept as it is; modified or even merged. Content merging can happen for instance when a new service is proposed by the composed network, by combining elementary services provided by the composing networks. A second reason for performing registry composition is that entities in the composed network may need access to a content hosted by a registry that was in a different network before composition. The interface of such a registry (e.g. SNMP, SQL) may be different from the one used by the interested entity. The granularity and the format of the registry content may also be different from those supported by the interested entity. A third reason for performing registry composition is that new registries may need to be created in order to store the composed content.

The registries to compose may be heterogeneous. They may be of different types (e.g. centralized, distributed), they may store heterogeneous types of information (e.g., raw data vs. aggregated data) that is presented using different formats (e.g., object oriented database, relational database), and they may rely on different interfaces to access the stored information. An interface is either a protocol (e.g. P2P information discovery protocols) or an Application Programming Interface (e.g. UDDI APIs). Registry composition is orchestrated by the Registry Composition Entity (RCE) and can be performed in two main steps, e.g., negotiation of the composition agreement and execution of the agreement.

Registry composition requires dynamic coordination between the control functional entities of the composing networks because these entities need to communicate in order to coordinate and regulate the composition. In order to perform registry composition, a signaling framework is needed.

Various signaling frameworks are available for other types of communication systems. For example, Resource ReSerVation Protocol (RSVP) is a resource reservation protocol, for simplex, multicast and unicast data flows. In RSVP, the signaling sessions are defined by the IP addresses of the source and the destination, which prevents RSVP from supporting session mobility. Furthermore, RSVP does not support symbolic names and the signaling is flow dependent. This signaling framework also presents a tight coupling between the signaling semantic (i.e., resources reservation) and the delivery of the signaling messages, which may be undesirable for registry composition.

Session Initiation Protocol (SIP) and H.323 are signaling frameworks associated with call control. SIP is an IETF standard and H.323 is a set of specifications from ITUT. However, SIP is a point-to-point protocol which does not separate the semantic of the signaling application from the message delivery. SIP is also not designed for negotiation and it does not support session mobility. Indeed, if the destination address changes during the same SIP session, there is no way to deal with this change and an error message 'destination unreachable' is sent to the entity trying to contact the entity whose address has been changed. H.323 also does not separate transport and signaling functionalities, and it supports neither session mobility nor symbolic names.

Other signaling frameworks include Cross Application Signaling Protocol (CASP), Next Step In Signaling (NSIS) and Generic Ambient Network Signaling (GANS). CASP is a general-purpose signaling protocol suite, which is employed to establish a control state about data flow along its path in the network. This signaling framework addresses the session mobility problem by introducing the concept of a location-independent session identifier. CASP reuses the existing transport and security protocols and decouples message transport from the next signaling hop discovery. NSIS re-uses many CASP concepts, e.g., it is modular, flexible and supports different applications. Furthermore, NSIS enables signaling across different network environments, can be used in different parts of the Internet (e.g., at the edge, in the core, etc.) and supports mobility by allowing efficient service reestablishment after handover. Examples of NSIS-based signaling protocols are the extended RSVP QoS signaling protocol and the middlebox configuration protocol.

GANS is a back-ward compatible generalization of NSIS with extensions including the support of symbolic, names and session mobility and flow independent signaling applications. Signaling applications can address destinations using symbolic names, which are translated by GANS' trans-port layer into corresponding IP addresses. A mechanism is provided to allow dynamic update of the IP-Symbolic name binding.

However, CASP and NSIS do not support both flow-dependent and flow-independent signaling applications, since they only define flow dependent signaling. Moreover, these signaling frameworks do not support symbolic names and, along with GANS, they support only one-to-one communication. Therefore, none of these signaling frameworks CASP, NSIS and GANS are independent of the negotiation model. Furthermore, none of these frameworks provide a signaling application that can be used for registry composition (i.e., none of the designed signaling applications deal with the registry composition specifics).

Accordingly, it would be desirable to provide new signaling frameworks, methods, systems, devices and software associated with network composition.

SUMMARY

According to an exemplary embodiment, a method for executing a negotiated registry composition agreement includes the steps of receiving a first message at an overlay node to activate the overlay node, the first message including a list of at least one registry that supports an interface being used by the overlay node, and sending, from the overlay node, a second message toward a re-director module of each of the at least one registry in the list.

According to another exemplary embodiment, a method for negotiating registry composition includes the steps of sending, from a mediator node, an offer to compose registries to at least two participant nodes, and terminating, by the mediator node, participation in the negotiation prior to reaching registry composition agreement.

According to yet another exemplary embodiment, a communication node includes a processor for executing a negotiated registry composition agreement by receiving a first message to activate an overlay node, the first message including a list of at least one registry that supports an interface being used by the overlay node, and by sending a second message toward a re-director module of each of the at least one registry in the list.

According to still another exemplary embodiment, a communication node which operates as a mediator for negotiating registry composition includes a processor for sending an offer to compose registries to at least two participant nodes, and which subsequently decides to terminate its participation in the negotiation prior to reaching a registry composition agreement.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1 illustrates a composable network according to one exemplary embodiment;

FIG. 3(b) shows the signaling architecture of FIG. 3(a) operating to convey messages between two applications or nodes;

FIG. 4 is a flowchart depicting a method for sending a message using a signaling layer and a messaging layer according to an exemplary embodiment;

DETAILED DESCRIPTION

Figure 2A:
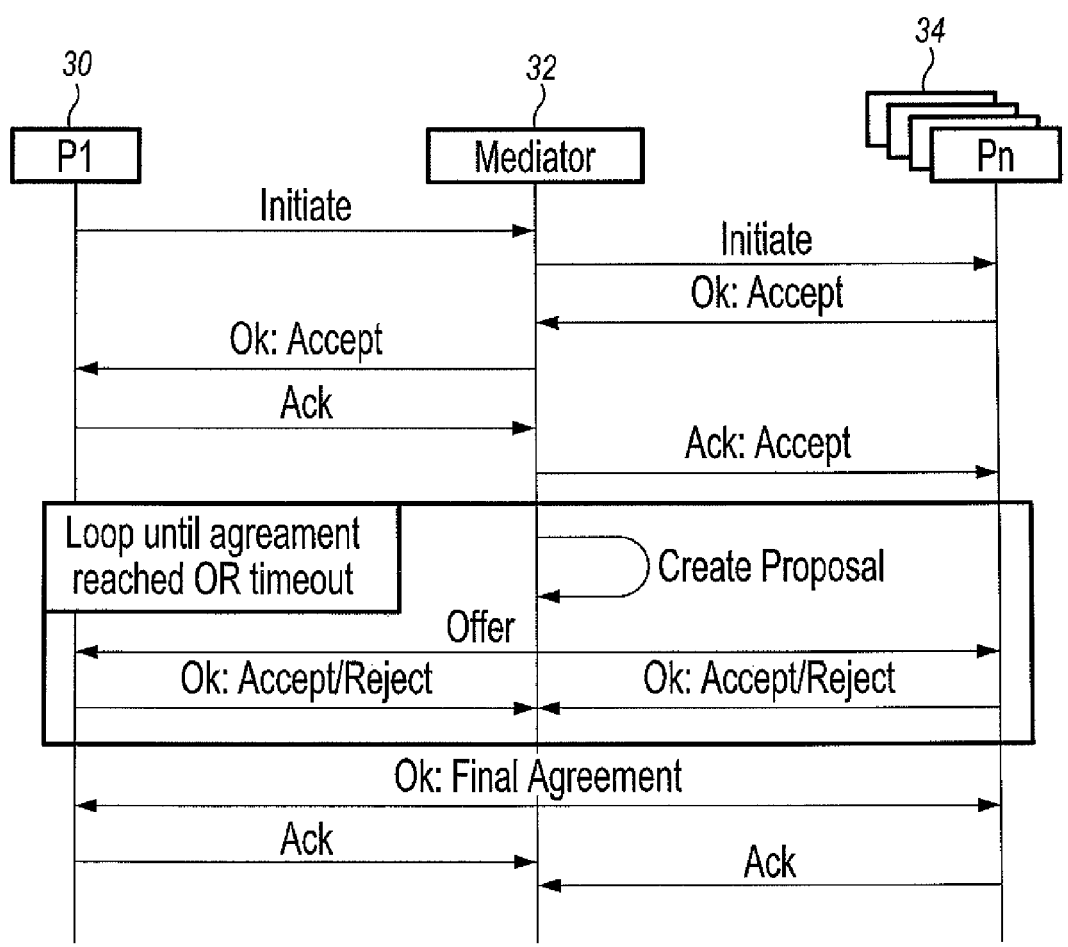
FIG. 2(a) illustrates signaling associated with negotiating network composition according to an exemplary embodiment.

Network composition enables "on the fly" interworking between heterogeneous networks without manual configuration or prior offline negotiation. Network composition results in the creation of a new post composition network, referred to herein as the composed network, in which resources of the pre-composition networks may be shared. As mentioned above, when networks compose, the hosted registries have to follow suit and compose as well. This requires dynamic coordination between the control functional entities of the composing networks because these entities need to communicate in order to coordinate and regulate the composition. Thus, the provision of a signaling framework which facilitates such communications to an Ambient Network architecture would be desirable.

Prior to discussing signaling frameworks according to these exemplary embodiments, an exemplary composable network in which such signaling frameworks can be employed will be described to provide some context. FIG. 1 illustrates a composable network 10 (e.g., an Ambient Network) according to one exemplary embodiment. The composable network 10 shown in FIG. 1 is based on the Ambient Network architecture proposed by the Ambient Network Project as described in "Ambient Networking: Concepts and Architecture (IST-2002-2.3.1.4), which is incorporated herein by reference. The network 10 may comprise one or more network nodes 22 that reside in the connectivity layer 12 of the network 10 and share a common network control space 14. The connectivity layer 12 comprises the logical and physical cal resources of the network 10, which may include one or more registries 24. There is one common network control space 14 for all of the nodes 22 in the network 10. The network control space 14 is logically present in the nodes 22. This network architecture does not imply a particular kind of implementation. For example, the network control space 14 can be implemented on a central server or in a distributed fashion where nodes 22 implement parts of the network control space 14.

The network control space 14 comprises a set of control functions to enable interworking between networks 10. These control functions, also referred to as functional areas (FAs), each handle a specific management task, such as Quality of Service (QoS), mobility, security, context awareness, and network composition. The composition FA is responsible for composition related functions as will be hereinafter described. Depending on the type of composition, a new network control space 14 may be created for the composed network.

The network control space 14 includes three interfaces: the network interface 16, the service interface 18, and the resource interface 20. The network interface 16 provides a standard mechanism to enable cooperation between the network control spaces 14 of different networks 10 and hides the complexities of the underlying network technologies so that networks 10 using different technologies appear the same. The networks use a technology independent signaling protocol, such as the Generic Ambient Network Signaling Protocol (GANS), to exchange information over the network interface 16. Applications or clients residing on network nodes 22 use the service interface 18 to access the services provided by the network control space 12. When two networks 10 compose, a single service interface 18 is created for the composed network. The resource interface 20 provides a mechanism to manage the resources residing in the connectivity layer. Applications use the resource interface (indirectly) to access the resources residing on network nodes 22 in the connectivity layer 14.

Individual networks 10 can compose to form composed networks, which can also compose with other networks 10. Network composition enables dynamic and instantaneous interworking of heterogeneous networks 10 on demand and in a transparent fashion without manual configuration or offline negotiation. When two networks 10 compose, they communicate with one another over the network interface 16 to negotiate a network composition agreement (NCA). The NCA specifies the resources that will be shared, the services that will be provided, and the policies that will be implemented to coordinate interoperation of the network control spaces 14 of the pre-composition networks 10. The result of the composition may be a newly composed network that includes all of the logical and physical resources contributed by the pre-composition networks 10. Composition, however, does not necessarily result in a new composed network.

Network composition is a significant feature of ANs which overcomes the limitations of today's static network cooperation, by providing dynamic cooperation between heterogeneous networks, on-demand. Indeed, today's network cooperation relies on off-line agreements and manual configuration operations, and enables access to a very limited set of services (i.e. those identified in the agreement). Network composition allows on-line agreement creation, and seamless and instantaneous access to new services. The cooperation process via network composition is transparent to the end users, but takes user context and network context into account.

Three types of network composition can, for example, be performed: network interworking, control sharing, and network integration. In the first type, each network 10 controls and manages its own resources and no composed network is created. In the second type, some of the resources of the composing networks 10 are contributed to a new composed network. This composed network has its own logical network control space. The composing networks 10 exercise joint control over the shared resources and keep control over the remainder of their own resources. In the third type of network composition, all of the participating networks 10 merge into a new composed network. The composed network thus includes all of the logical and physical resources in the composing networks. A new logical network control space 14 is created during composition and manages the composed network.

The pre-composition networks 10 may include registries 24 that can be accessed by applications. A registry 24 is any authoritative store of information or repository of data, such as a database. The registries 24 hosted by the pre-composition networks 10 can be of different types (e.g., centralized, distributed), they can store different types of information using different formats (e.g., object oriented database, relational database), and they can rely on different interfaces to access the stored information (i.e., protocols such as P2P information discovery protocols or programming interfaces such as UDDI APIs). The registries 24 may also have redirectors associated therewith for redirecting certain requests for information as will be described in more detail below.

According to the present invention, the concept of composition is extended beyond simple network composition to include composition of registries 24 existing in the pre-composition networks 10. When two networks 10 compose, two or more individual registries 24 in the constituent networks 10 are merged into a single logical registry, referred to herein as a merged registry. As used herein, the term "merge" does not necessarily imply the physical merging of the registries 24, but also includes the logical linking of registries 24 so that the combined resources appear to an application in the composed network as a single registry 24. Clients are provided the ability to automatically and seamlessly access the content of the various post composition registries that comprise the merged registry 26. This objective can be achieved by providing an overlay architecture for information discovery and publication after network composition. More information regarding registry composition and overlay networks can be found in, for example, U.S. patent application Ser. No. 11/614,808, entitled "Architecture for an Automatic Composition of Registries When Networks Compose", filed on Dec. 21, 2006, and published as U.S. Patent Publication No. 2008-0133727, the disclosure of which is incorporated here by reference.

Briefly, an exemplary negotiation protocol associated with registry composition can have three entity roles: i.e., the initiator, the responder and the mediator. The initiator is the entity that initiates the negotiation. The responder is the entity that receives an agreement proposal and decides on its acceptance. In some cases, e.g., point-to-multipoint, there may be multiple responder entities. Collectively, the initiator and responder entities are also referred to herein as "participants". The mediator orchestrates the negotiation and creates the proposals. The negotiation protocol according to exemplary embodiments defines four types of requests (i.e., Initiate, Ack, Offer, and Bye) and one response type (i.e. Ok). Each response includes a response code that specifies the type of the response (i.e. Accept, Reject, Agreement, and Error).

To start a negotiation session, the initiator 30 sends an Initiate message to the mediator 32, along with the list of participants with which it wants to negotiate as shown in FIG. 2(*a*). If the mediator 32 agrees to arbitrate the new session, it sends an Initiate message to all of the participants 34 in the list and sends an acknowledgement accepting the role of mediator back to the Initiator 30. The responders 34 may either accept or reject the negotiation. If the negotiation is accepted, as shown in FIG. 2, the mediator 32 creates a proposal, sends it to all of the participants 30, 34 using the Offer message and then analyses their responses. If the proposal is rejected, the mediator 32 creates a new proposal and restarts the process. This is repeated until an agreement is reached, an error is encountered or the negotiation timeout expires. Then, the mediator 32 creates the final response (e.g. Ok: Error or Ok: Agreement) and sends it to the participants 30, 34.

After the negotiation is started, an entity may need to leave the negotiation (e.g., if the network to which it belongs moves away from the other networks). Accordingly, the negotiation protocol according to these exemplary embodiments enables entities (i.e., a participant 30, 34 or a mediator 32) to quit the negotiation. When a participant 30, 34 decides to quit, it sends a Bye message to the mediator 32. The mediator 32 will either continue the negotiation with the remaining participants or end the negotiation, depending on the negotiation policies (e.g., the negotiation is ended if only one participant 30, 34 remains in the negotiation). If the mediator 32 decides to quit, it sends a Bye message to all of the participants 30, 34, which results in the termination of the negotiation process.

According to exemplary embodiments, the negotiation protocol is further extended to enable the negotiation to continue even if the mediator 32 that orchestrates the negotiation quits. Two cases are considered herein: voluntary and forced departure. Voluntary departure occurs when the mediator 32 decides to leave the negotiation (e.g., if the network to which it belongs moved away from the other networks). Forced departure occurs when the mediator 32 is forced to disconnect from the network (e.g., node failure, connectivity problems, etc.). Starting first with voluntary departure, if an active mediator 32 (i.e., the mediator that is orchestrating an ongoing negotiation) decides to quit, it should insure that the negotiation process will continue among the remaining participants. Therefore, the mediator 32 which intends to voluntarily depart the negotiation should find another mediator 32 that can replace it. This can, for example, be accomplished as follows.

Each mediator 32 is responsible for keeping track of the other mediators 32 in the network. When a mediator 32 joins the network, it publishes itself to the network members. This can be done using any desired information publication protocol (e.g. PDP). When a mediator 32 receives a publication message from another mediator 32, the mediator 32 receiving the publication message then establishes a connection with the newly joined mediator 32. This results in the creation of an overlay network between all of the mediators in the network as shown in FIG. 2(b).

When an active mediator 32 decides to quit a negotiation, it sends a Bye message to one of its neighboring mediators 32, along with the current status of the negotiation and its related information. If no other mediator 32 is part of the network, the mediator 32 sends a Bye message to all of the participants 30, 35, which will terminate the negotiation process. According to one exemplary embodiment, the mediator 32 cannot quit the negotiation if it is waiting for a message from one or more participants. Indeed, if this is allowed, the expected message will be lost, and the status transferred to the new mediator 32 will be corrupted. Therefore, the mediator 32 should quit only when it is in a stable state (i.e., no expected incoming message is missing). The participants 30, 34 will get the address of the new mediator 32 in the next message they receive.

To address forced departures of a mediator 32 according to an exemplary embodiment, each active mediator 32 can choose one of its neighboring mediators 32, e.g., randomly, as its backup. Assuming that the probability that both an active mediator 32 and its backup leave the network at the same time is very low, a single backup mediator 32 may be sufficient. Alternatively, multiple backups could be selected by each active mediator 32. According to this exemplary embodiment, each mediator 32 facilitates detection of the forced departure of the other mediators 32 which it is backing up by periodic heartbeat messages. More specifically, and according to one purely illustrative exemplary embodiment, the scheme proposed in Chunyan Fu, Roch Glitho, and Ferhat Khendek, A Novel Session Recovery Mechanism for Cluster-based Signaling Architecture for Conferencing in MANETs, In the Workshop on Wireless Ad hoc and Sensor Networks (WWASN 2007), June 25, Toronto, the disclosure of which is incorporated here by reference, can be used to detect heartbeats for insertion of backup mediators into a negotiation process.

Therein, a session recovery mechanism is proposed for cluster-based signaling architecture for conferencing in MANET. The conference participants are organized in different clusters, and each cluster has a super-member that is responsible for detecting the forced departure of the members of its cluster and the other super-members. To reach this goal, each super-member maintains a heartbeat session with each member of its cluster and with each of the other super-members. A session is defined as a signaling link between two nodes and heartbeat is defined as a periodic exchange of a request and a reply. According to the present exemplary embodiment, the super-member is the mediator 32, and the members are the participants 30, 35. The session is a link between a mediator 32 and a participant 30, 34 or between two mediators 32.

The backup mediator 32 periodically sends a heartbeat request to the active mediator 32 and starts a timer. If the timer fires and no reply is received, the backup mediator 32 re-sends the request and restarts the timer. If there is still no reply upon a predetermined number of requests, e.g., 1, 2, 3 or 4, the backup mediator 32 decides that the active mediator 32 has unintentionally departed and takes over the role of active mediator for that negotiation. If a backup mediator 32 is no longer reachable, the active mediator 32 to which it is assigned chooses a new backup. If the active mediator 32 disappears, its backup will detect its forced departure using the heartbeat scheme, and will continue its ongoing negotiation sessions.

Figure 2B:
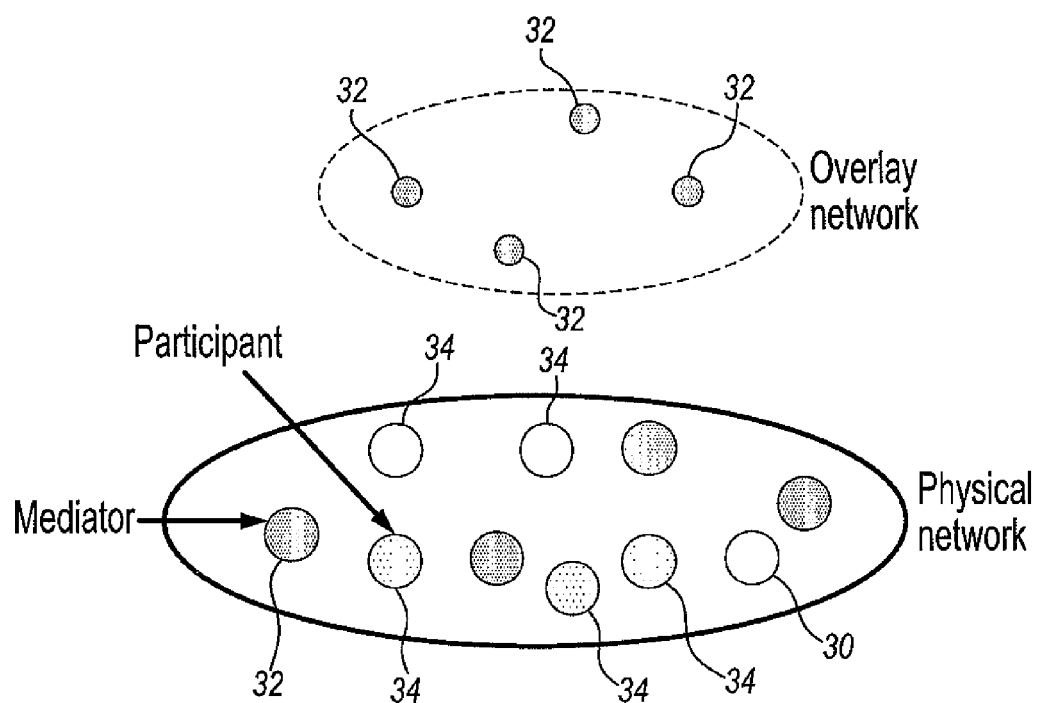
FIG. 2(b) illustrates a mediator overlay according to an exemplary embodiment.

According to exemplary embodiments, a signaling framework can be provided to facilitate the signaling illustrated in FIG. 2(a) and described above with respect to mediator departure and FIG. 2(b). Such a signaling framework according to these exemplary embodiments is intended to have various characteristics. First, the signaling framework should support the negotiation and execution of the composition agreement, for registry composition. Second, it should support symbolic names and session mobility, not rely on a permanent central entity and be lightweight. Indeed, in ANs, entities may leave and join the network at any time, using the same or a different IP address and port number, and they may use symbolic names to address destination entities. Furthermore, an AN can include different types of de-vices, with heterogeneous capabilities. Therefore, the signaling framework should be lightweight in order to be used by any of theses devices (e.g. including devices with limited resources). Third, the signaling framework should be independent of the negotiation model, i.e., it should support negotiation with or without mediator, support different decision models for the negotiation (e.g. Accept-it-or-leave-it, offer/counteroffer) and support different negotiation approaches. Negotiation can be either one-to-one (i.e. between two entities) or one-to-many (i.e. one entity communicating with more than one entity at the same time) or many-to-many. Therefore, to be independent of the negotiation model, the framework should also allow point-to-point and point-to-multipoint message delivery. Point-to-point message delivery is used for one-to-one negotiation. Point-to-multipoint is used for one-to-many and many-to-many negotiation. Negotiation approaches include parallel negotiation, sequential negotiation and hybrid-negotiation. These approaches are defined when the negotiating parties are negotiating multiple issues and correspond to, for example, negotiating parties presenting all their demands/offers at once, one by one, and group by group, respectively.

Fourth, the signaling framework should allow ex-change of the negotiation agreements and proposals. Fifth, it should be modular and extensible. Sixth it should separate the semantic of the signaling application (i.e. registry composition) from the message delivery, so that it can be easily extensible. Seventh, it should enable the usage of existing and standard transport protocols (e.g., TCP, UDP), for transporting signaling messages. Eighth, it should support flow-dependent signaling applications, where the signaling messages follow the flow data path, and flow-independent signaling applications (e.g. network composition). However, those skilled in the art will appreciate that exemplary signaling frameworks according to these exemplary embodiments may exhibit all, or only a subset, of these eight characteristics.

To provide these capabilities, signaling frameworks according to these exemplary embodiments are architected as backward compatible, extended versions of the IETF NSIS (Next Step in Signaling), for which the unextended version is described in the article "Next Step in Signaling (NSIS): Framework, RFC 4080, June 2005, the disclosure of which is incorporated here by reference. More specifically, exemplary embodiments described below provide two types of extensions to the NSIS framework: a messaging layer extension and a Signaling Application for Registry Composition (SARC). Briefly, the messaging layer extension is provided to support flow independent applications, support symbolic names and provide a group management solution to allow point-to-multipoint message delivery. SARC supports signaling associated with different negotiation models for registry compositions. Each of these extensions will now be described in more detail as part of the discussion of an overall, exemplary signaling architecture illustrated as FIG. 3(a).

Figure 3A:
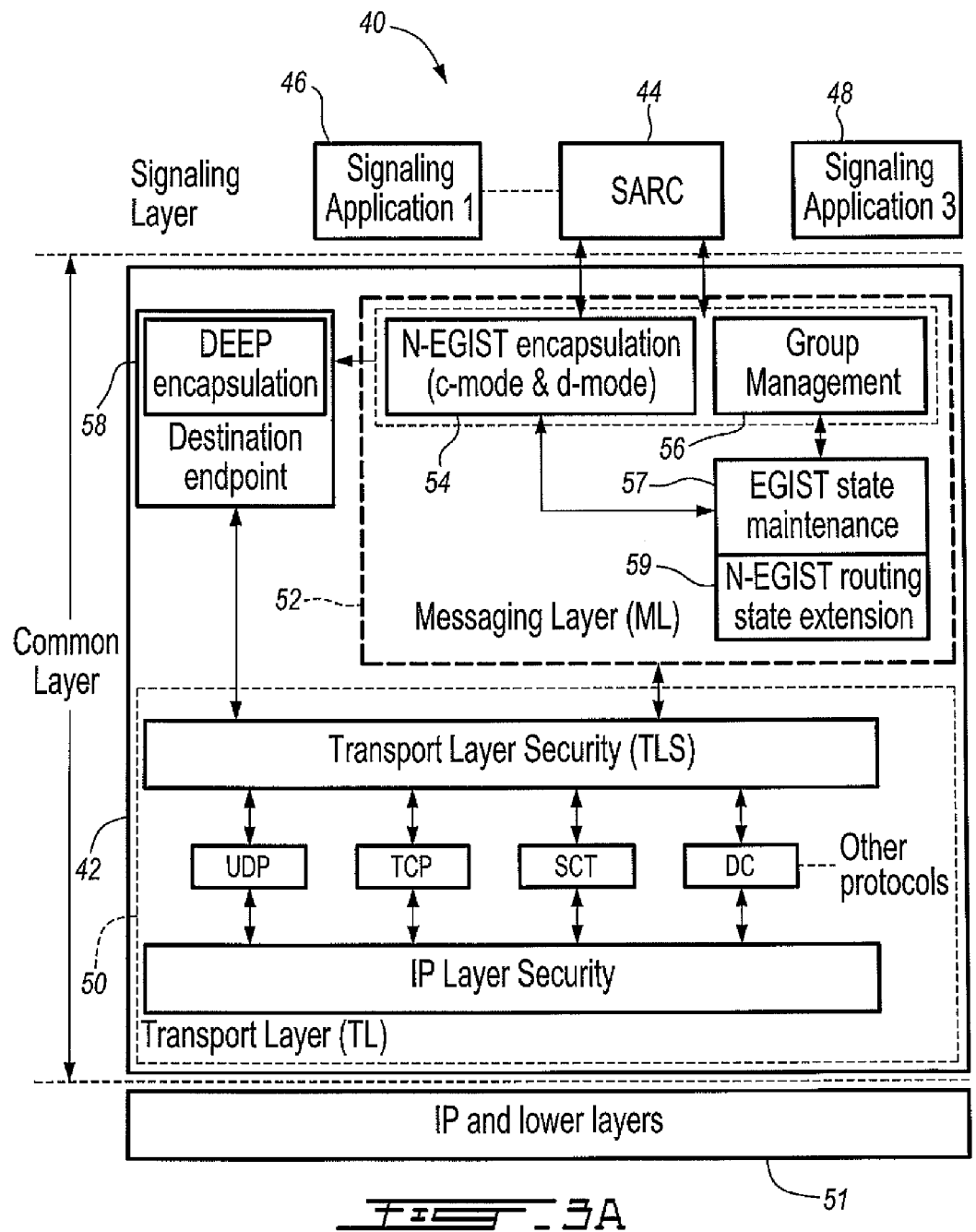
FIG. 3(a) depicts a signaling architecture according to an exemplary embodiment.

The architectural design of these exemplary signaling frameworks is based on two layers shown in FIG. 3(a): the signaling layer 40 and the common layer 42. The signaling layer 40 includes the SARC application 44, which is of particular interest for this discussion, but can also include any GANS, NSIS or other signaling application 46, 48. The common layer 42 provides functionalities that are common to all of the signaling applications 44, 46 and 48, e.g., message transportation from one node to another. Thus, the common layer 42 includes a transport layer 50, including transport layer security (TLS) and IP layer security, which is responsible for transporting negotiation messages and a messaging layer (ML) 52 that executes common functions before sending the message to its destination. The messaging layer 52 according to this exemplary embodiment uses existing standardized transport protocols (e.g., TCP, UDP), provided by the transport layer 50, to transmit signaling messages, such as those illustrated in FIG. 2(a). The common layer 42 sits between the signaling layer 40 and lower layers, e.g., the IP layer 51.

The messaging layer 52 comprises two main building blocks: Negotiation-EGIST (N-EGIST) function 54 and Group Management (GM) function 56. N-EGIST function 54 is an extension of the GANS' EGIST function. The GANS' EGIST function provides for support of flow-independent applications and symbolic names. To extend this functionality, the N-EGIST function 54 according to this exemplary embodiment also includes: (1) support of point-to-multipoint signaling, (2) group management, e.g., group members can be identified by their IP addresses and/or symbolic names, (3) interaction between signaling applications 44, 46 and 48 and GM function 56, (4) storage and maintenance of the name binding state, without modifying the routing state information used by EGIST for routing messages towards the group members, and (5) extension of EGIST APIs to handle point-to-multipoint message delivery, which features are not found in EGIST functions described in the GANS framework.

Regarding this latter point, i.e., extension of EGIST APIs, several new parameters associated with EGIST primitives are provided in N-EGIST function 54 to support signaling associated with the aforedescribed negotiations. For example, the SendMessage primitive is used by signaling applications 44, 46 and 48 to send a message to one or more destinations. According to these exemplary embodiments, it has two new parameters: group_id and min_resp. The Group_id parameter identifies the group to which the message should be sent. The Min_resp parameter is the minimum number of different responses that N-EGIST 54 must receive before responding to the application. The Timeout parameter, already defined by GIST, is used as the length of time the N-EGIST layer can wait for min_resp responses.

As another example, the RecvMessage primitive is used by N-EGIST function 54 to transmit received messages to signaling applications 44, 46, and 48. In the case of a response, N-EGIST function 54 verifies whether that response this belongs to an application that requires a certain number (i.e., the value of the min_resp parameter) of responses. If this is not the case, the response is directly transmitted to the application. Otherwise, N-EGIST function 54 waits until it receives the minimum number of required responses, or until the waiting timeout expires. Then, N-ESIST function 54 creates a list containing the number of the responding parties along with their names and responses and passes it to the signaling application 44, 46, 48.

The group management module 56 according to this exemplary embodiment provides the signaling applications 44, 46, 48 with four APIs:

Create_group: creates a communication group, to enable communication with more than one destination (e.g. in case of one-to-many negotiation). This API takes as a parameter the list of symbolic names and/or IP addresses of the destination entities. At least one of the names and IP parameters is not null for each group member. Each group has a unique identifier.

Add_member(group_id, name, ip): Adds a new member-identified by its name or IP address- to a created group.

Remove_member(group_id, name, ip): removes the member identified by its name or IP address from a given group.

Change_member_ip(name, ip): If a group member changes its IP address and the application somehow becomes aware of the new address, it uses this API to make necessary changes to the stored routing state.

To aid in group-related messaging, N-EGIST function 54 obtains the IP addresses of the group members and sends the message to each of them. The addresses of the group members are stored in the routing state table when the group is created. Destination Endpoint Exploration Protocol (DEEP) function 58 is used to obtain the IP address corresponding to a given symbolic name. The E-GIST state maintenance function 57 stores routing information such as mappings between symbolic names and associated IP addresses. The N-EGIST routing state extension function 59 extends the EGIST state maintenance function 57 to allow the storage and maintenance of the routing information such as the list of members of each group along with their symbolic names and IP addresses.

Having now described various aspects of the common layer 42, the discussion will now move on to the signaling layer 40 and, more specifically, to exemplary embodiments of SARC 44. The primary function of SARC 44 is to transfer different messages related to registry composition—encapsulated in SARC messages—between communicating peers. According to this exemplary embodiment, the architecture of SARC 44 includes the definition of two entities: Requestor and Responder. The Requestor is the entity that sends a request and the Responder is the entity that responds to the request. Next, exemplary details associated with SARC APIs, message types, formats, and end-to-end behavior will be provided

Regarding APIs, SARC 44 provides the group management primitives described above, plus the following two interfaces. First, a SendMessage API is provided which can be used by negotiating entities to send a message to peer entities. The primary parameters associate with this API are the type and the payload of the message to send, min_resp, the ID of the destination group (for sending requests), the destination IP address and name (for sending responses), the decision model to use for the negotiation and the negotiation approach. Secondly, a RcvMessage API is provided which can be used by SARC 44 to pass the content of a received message to the local negotiating entity. SARC messages according to this exemplary embodiment include a common header, which indicates the message type, followed by a body made up of a variable number of Type-Length-Value (TLV) objects. This structure makes them flexible and easily expandable. SARC messages according to this exemplary embodiment are of two types: CANegotiation and CAExecution. CANegotiation messages are used for composition agreement (CA) negotiation, whereas CAExecution messages are used for CA execution.

Each of the two message types has sub-types. These sub-types are as follows:

CANegotiation sub-types: Initiate, Ok, Ack, Offer, and Bye.

CAExecution sub-types: ActivateNode, ConfigOv-Node, Join, and Quit.

Starting first with the CANegotiation sub-types, which are, for example illustrated in FIG. 2(*a*), the Initiate message can include, for example, three TLV objects or fields: a local information object, a conditions object and negotiation model object. The local information object includes the information that is local for each network and which is necessary for the creation of the agreement proposals. For example, this local information may include a list of registry information objects, where each registry information object describes a registry in the composing network, e.g., including information such as the registry type, Information Publication and Discovery Interface (IPDI) and address. The IPDI is a generic name which refers to different interface types. This identifier is also used for directing/redirecting requests. For example, clients send requests to the registry which supports the same IPDI as they do.

The conditions object includes the initiator conditions (if any) concerning the negotiation (e.g., an agreement is reached only if it is accepted by all of the participants). The negotiation model object includes information about the negotiation model to use for a particular negotiation which is being initiated by the message, e.g., the negotiation approach and the decision model.

The Offer message can include, for example, two objects or fields: an offer Identifier object and an offer data object. The offer identifier object is a cryptographically random identifier chosen by the entity that created the offer. The offer data object includes the offer content, and it may be itself a set of TLV objects. Each Ok and Ack message carries a TLV INFO object, which contains a response code and the corresponding object. The response codes according to this exemplary embodiment are as follows:

0x1: Accept
0x2: Reject
0x3: Agreement
0x4: Error

Each of the Agreement and Error codes described above has a corresponding TLV object of the same name. The Agreement object includes three fields: an agreement identifier field, an agreement data field and an agreement validity time. The first two objects are similar to the offer identifier object and offer data object. The agreement validity time specifies the time after which the agreement is no longer valid. Similarly, the Error object has an error data field, which includes the error description. A message carrying a Reject code may transport a reason object, which describes the reason of the rejection. A message with an Accept code may carry a local information object (e.g., when the message is a response to an Initiate message, sent from a destination participant to the mediator to accept the negotiation).

Turning next to the CAExecution sub-types, whose function is described in more detail below with respect to FIGS. 5 and 6, the ActivateNode message carries the list of the one or more registries which support the same IPDI as the message destination. Each registry is described using a Registry Information object. ConfigOvNode also uses a Registry Information object to carry information about the overlay node (e.g., its IP address). The Join and Quit messages carry a Registry Information object, describing the registry that wants to join or quit a composed network. If the Quit message is sent by an overlay node, it should also include the list of the registries that are served by the quitting node (i.e. the registries belonging to the multicast group maintained by the quitting overlay node).

FIG. 3(*b*) shows the architecture of FIG. 3(*a*) (referred to therein generally by reference numeral 300) at a higher level to perform signaling between a requester 302 and a responder 304 according to exemplary embodiments. The requester 302 generates a message which is processed in turn by SARC 44, messaging layer 52, and transport layer 50. The message may be conveyed from the requestor node to the responder node via an intervening network which may (or may not) use a different transport layer 306 than that provided by architecture 300. The responder 304 propagates the request message up through its architecture 300, and returns a reply back along the reverse path as shown.

FIG. 4 is a flowchart which illustrates a method for a requestor 30 to send a one-to-many (point-to-multipoint) message using the aforedescribed signaling framework and messaging formats according to an exemplary embodiment. Therein, the notation SARCi and MLi refers to the signaling application 44 and the messaging layer 52 on the requester side, respectively. At step 400, a requestor or initiator 30 ($R_i$)

decides to send a message. Then, a destination group ($G_i$) is created at step 402, e.g., using the Create_group API of group management module 56 described above. The requester then passes the message to be sent ($m_i$) to the $SARC_i$ 44 using the SendMessage primitive described above at step 404. The $SARC_i$ checks, at block 406, to see if the message $m_i$, to be sent is associated with an existing SARC session or not. If so, then the flow moves directly to step 408 wherein the $SARC_i$ 44 passes the message to the messaging layer 52. Otherwise, if there is no existing SARC session associated with this message to be sent, one is first created at step 410. Similarly, at step 412, the messaging layer 52 checks to see if it has an existing session associated with the message $m_i$ which it has now received from the $SARC_i$ 44. If so, then the flow follows the "Yes" branch to block 414, wherein the $ML_i$ encapsulates the message $m_i$ in an appropriate message layer message m2. Otherwise, the ML first creates a new ML session for this message at step 416. The message layer 52 then obtains the members' addresses associated with group $G_i$ from a state database at step 418 and uses that information to send the messages m2 to each member in the group at step 420. On the destination side, (not shown in FIG. 4), the counterpart ML 52 receives the message m2, records the state information, processes the message (e.g., verifies if min_res is required), and passes the appropriate message to the Responder.

The registry composition process described above results in, for example, the creation of an overlay network (i.e., a Registry Overlay Network) that provides the interested entities in the composed net-work with uniform and seamless access to the content of all of the registries in that network. The Registry Overlay Network (RON) includes a single overlay node for each Information Publication and Discovery Interface (IPDI) used by a registry in the composed network, and this overlay node supports that IPDI.

Figure 5:
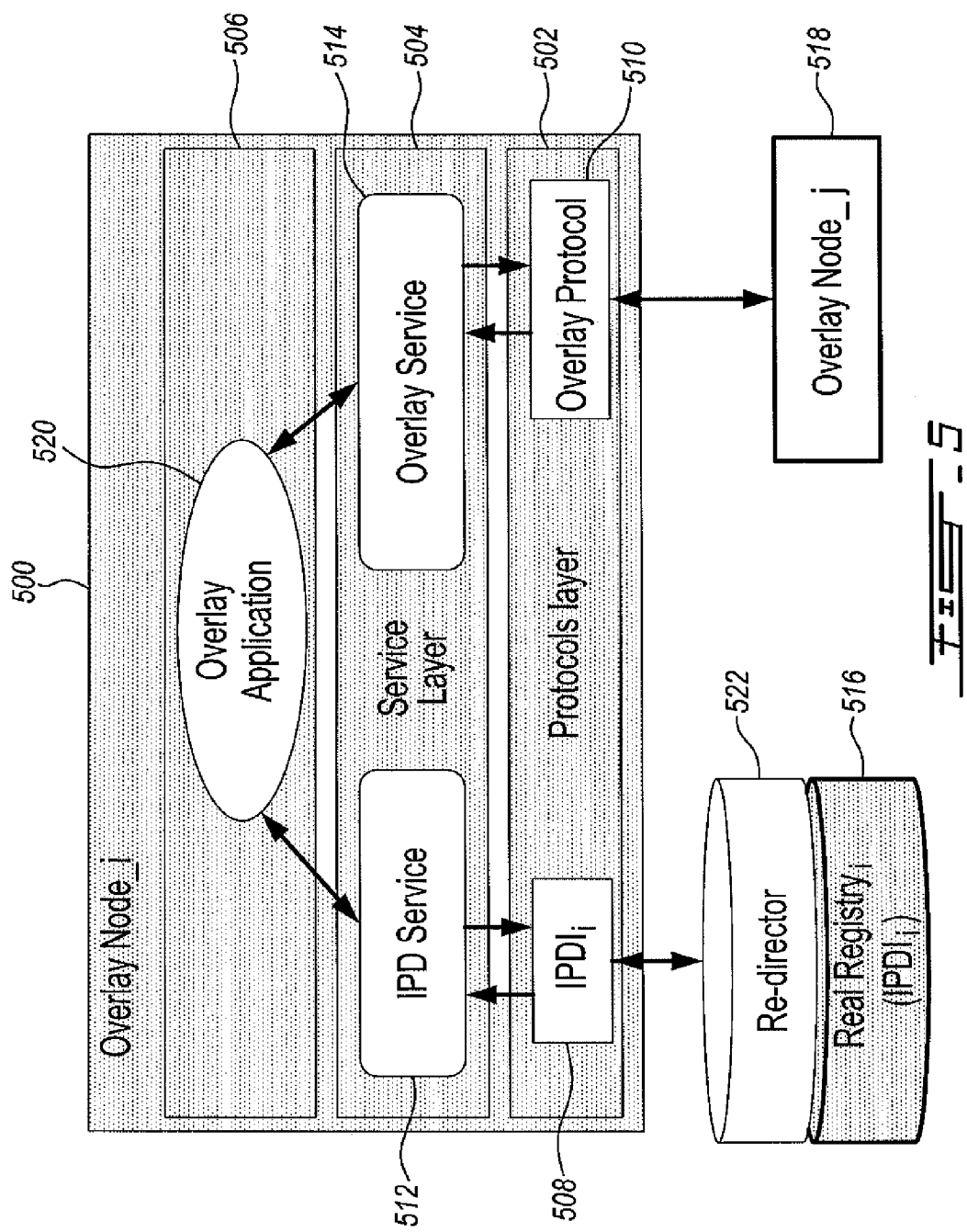
FIG. 5 illustrates an overlay node according to an exemplary embodiment.
Figure 6:
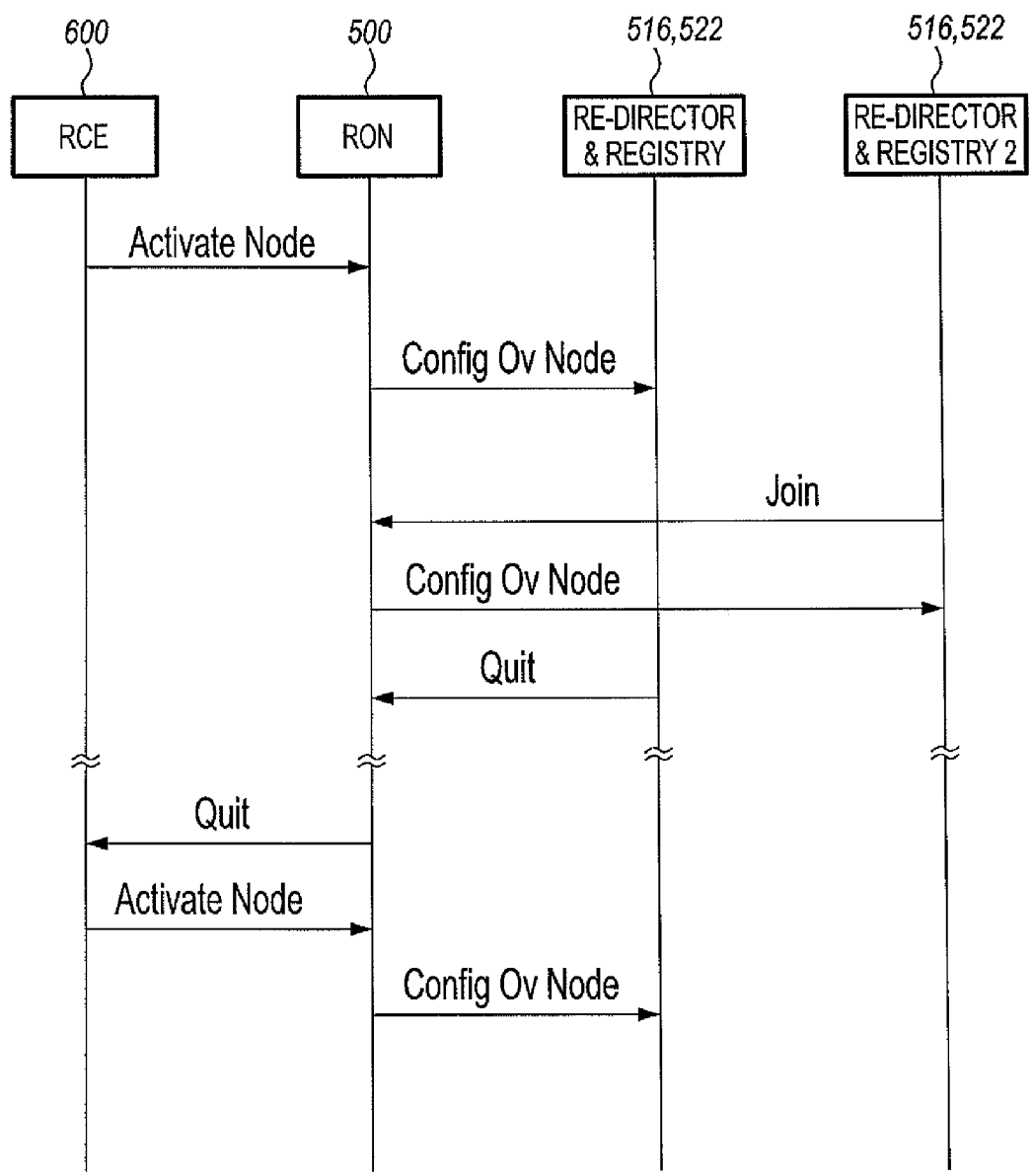
FIG. 6 is a signaling diagram associated with executing a negotiation agreement to create an overlay network according to an exemplary embodiment.

FIG. 5 depicts the architecture of an exemplary overlay node 500 which can be the result of a successful negotiation signaling process as described above. The exemplary overlay node 500 includes a protocols layer 502, a service layer 504 and an overlay application 506. The protocol layer 502 includes the IPDI 508 supported by the overlay node 500 and the overlay protocol 510 used to communicate with the other overlay nodes. The service layer 504 includes two modules: IPD Service 512 and Overlay Service 514. These modules 512 and 514 provide the necessary functions to communicate with the actual registries 516 and the other virtual nodes 518, respectively. The overlay application 520 includes the necessary intelligence for information publication and discovery. Clients send their requests to the registry 516 that supports the same IPDI as they do. If the registry 516 has the requested information (in case of discovery requests), the registry 516 responds directly to the client. Otherwise, the registry 516 redirects the request to the RON 500 (via re-director 522), which RON 500 identifies the registry 516 where the requested information is stored, retrieves this information, and responds back to the client. The re-director module 522 can be added to the actual registry 516, in order to allow the redirection of the client requests to the RON 500 as needed.

According to exemplary embodiments, each overlay node 500 is, e.g., randomly, mapped to a registry 516 that supports the same IPDI using, for example, the CAExecution message sub-types described above. An exemplary signaling diagram is illustrated in FIG. 6. To create the RON 500, the RCE 600 responsible for the composition sends an ActivateNode message to the relevant overlay node 500 to activate it, along with the list of the registries that support the same IPDI to which the overlay node 500 is being mapped (the overlay node having been previously installed and awaiting activation). After an overlay node is initialized, it sends a ConfigOvNode message to the re-director module 516 of each registry 522 in its related list. This configures the address of the overlay node 500 to which requests should be re-directed. After the creation of the RON, another registry 516 may want to join (e.g., the registry 516 rejoins the composed network after having moved out of the coverage area for a while) or leaves the composed network (e.g., networks decompose). This is achieved by the respective registry 516 sending a Join or Quit message to the overlay node 500 to which it was (or is) connected, examples of which are also shown in FIG. 6. If the quitting registry 516 is also an overlay node, it sends a Quit message to the RCE 600 that orchestrated the RON creation. The RCE 600 will then replace the overlay node with another registry that supports the same IPDI as the one which is quitting. This latter functionality is illustrated by the three signals at the bottom of FIG. 6 (albeit the ActivateNode message will likely be sent to a different overlay node (not shown) than the one which sent the Quit message). In the case of a Join message from a "new" registry, a ConfigOvNode message is expected as response from the RON 500, to insure that the overlay node is and that it accepts the addition of the returning registry 516 to its multicast group.

To test the afore-described signaling frameworks, various simulations were conducted. These involved measurements of, for example, two characteristics: network load and delay. Regarding network load, the number of messages which were transmitted associated with negotiating a network composition, for a participant and a mediator to quit the negotiation, for RON creation and for a registry to join and quit the RON were measured and/or calculated. Delays were calculated in seconds and included measurement of the following types of delays: total time delay for successful negotiation and for RON creation, average propagation time delay for successful negotiation, RON creation and for a virtual registry to quit the RON. Total time delay for successful negotiation is the total time delay required for the complete negotiation, i.e., the difference between the time when the initiator 30 creates the first Initiate message, and the time when the mediator receives the last Ack for the agreement. These measurements do not include the delays for internal processing related to the negotiation (e.g., agreement creation).

Similarly, the total time delay for RON creation is the total time delay required for the complete RON creation, i.e., a difference between the time when the RCE creates the first ActivateNode message and the time when the last registry receives a ConfigOvNode message. A different ActivateNode message, e.g., containing different information such as the multicast group members, is created for each virtual registry. Average propagation time delay is the average time delay for a single message to get from the source to the destination.

Figure 7:
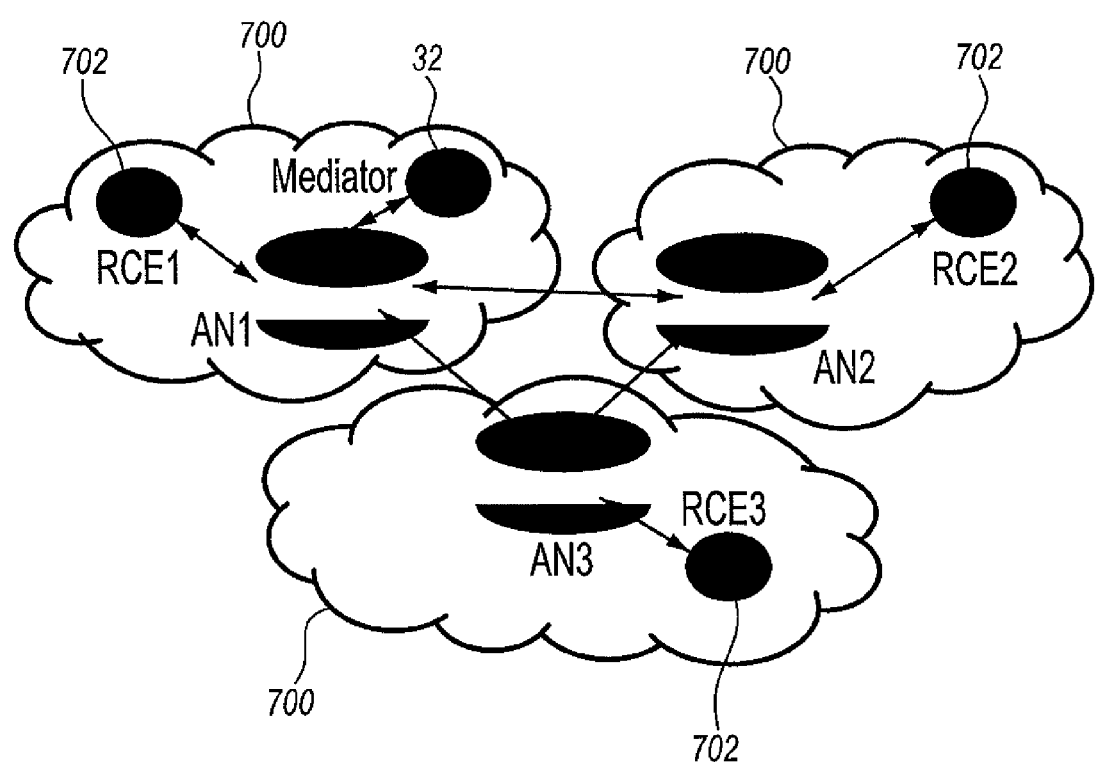
FIG. 7 illustrates an exemplary set of pre-composition networks used in various simulations associated with the exemplary embodiments.

The composed network being simulated was composed of a number of networks 700, each containing a Registry Composition Entity (RCE) 702, the functional entity responsible for registry composition, as shown in FIG. 7. The mediator 32 was modeled as a separate entity and was part of one of the composing networks 700. During the simulation, the number of composing networks 700 was varied (although three are shown in FIG. 7 as an example) and the scalability parameters were calculated for each case. In general, only a small number (e.g., 2 or 3) of networks will typically compose with one another at a given time, e.g., since not all of the networks will move near to one another at the same time. The situation where a larger number of networks are composing can be seen as a number of successive composition sessions between a limited numbers of networks. Thus in the following examples, the negotiation process has been simulated for 2, 3, 5, 10, 15 and 20 entities.

Figure 8:
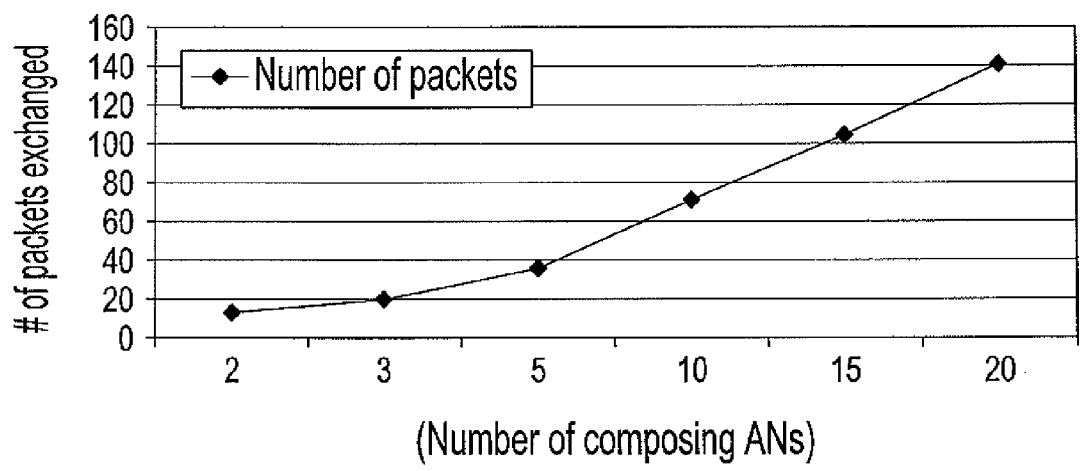
FIGS. 8 and 9 illustrate simulation results associated with registry composition negotiations using variations of the pre-composition networks of FIG. 7.
Figure 9:
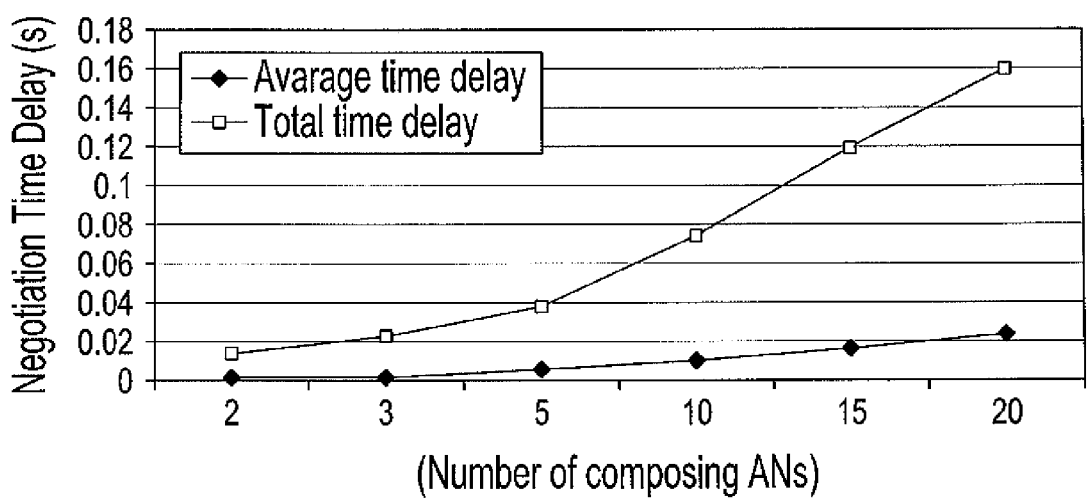

From FIG. 2(a), it can be seen that, in order achieve a successful negotiation between two entities, 14 messages are needed (or 7 for the case that the mediator is co-located with one of the entities). For each extra entity involved in the process, 7 extra messages are needed. Therefore, the number (nbr) of exchanged messages between n entities in a successful negotiation is nbr=7n (or 7n−7 if the mediator is co-located with one of the entities). This is because the messaging layer, on the mediator side, sends a copy of each outgoing message to each of the group members. This formula was validated by the simulation results (FIG. 8). To reduce the number of exchanged messages (nbr), a multicast solution can be utilized, which will duplicate messages only when needed. FIG. 9 presents the average message propagation time delay in each of the six simulations and also presents the total time delay for successful negotiation. The time delay is linearly proportional to the number of composing networks, and it remains barely noticeable by the client. The average time delay varies by less than 0.01 s (0.05 s for total time delay) for each additional five networks. The total time to complete negotiation between 20 ANs is less than 0.16 s.

The number of messages exchanged to allow an entity to quit the negotiation according to this exemplary embodiment is two (i.e., a Bye message followed by an Ok message). The total time delay needed for a participant to quit the negotiation is the time needed to exchange those two messages (e.g., about 0.04 s in the case where 20 entities are negotiating). This time remains negligible compared to the total negotiation time delay and the quitting process does not disturb too much the negotiation process among the remaining parties. However, in case of a mediator quitting the negotiation, the quitting time delay depends on the amount of information to be exchanged between the new and the quitting mediators.

Figure 10:
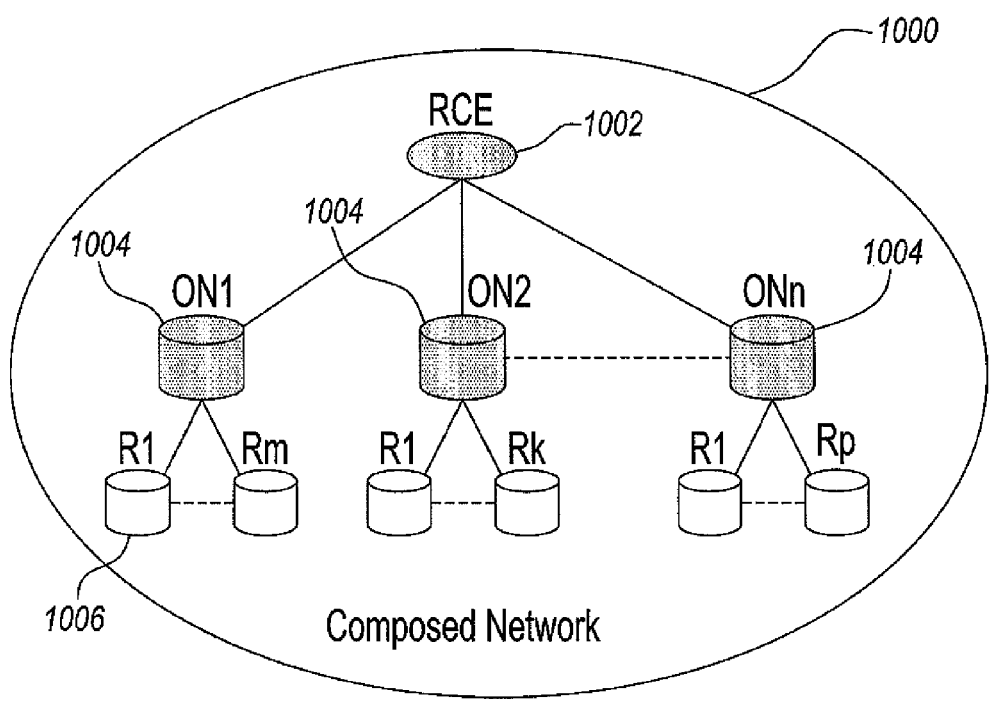
FIG. 10 illustrates an exemplary composed network used in various simulations associated with the exemplary embodiments.
Figure 11:
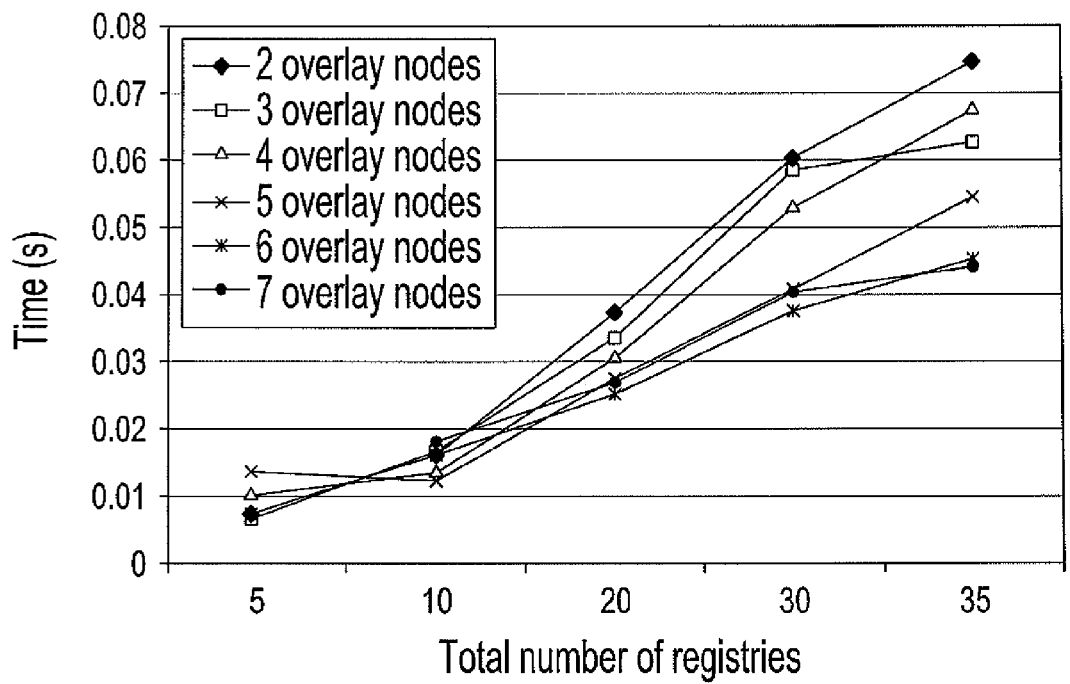
FIGS. 11-14 illustrate simulation results associated with registry composition execution using variations of the composed network of FIG. 10.
Figure 12:
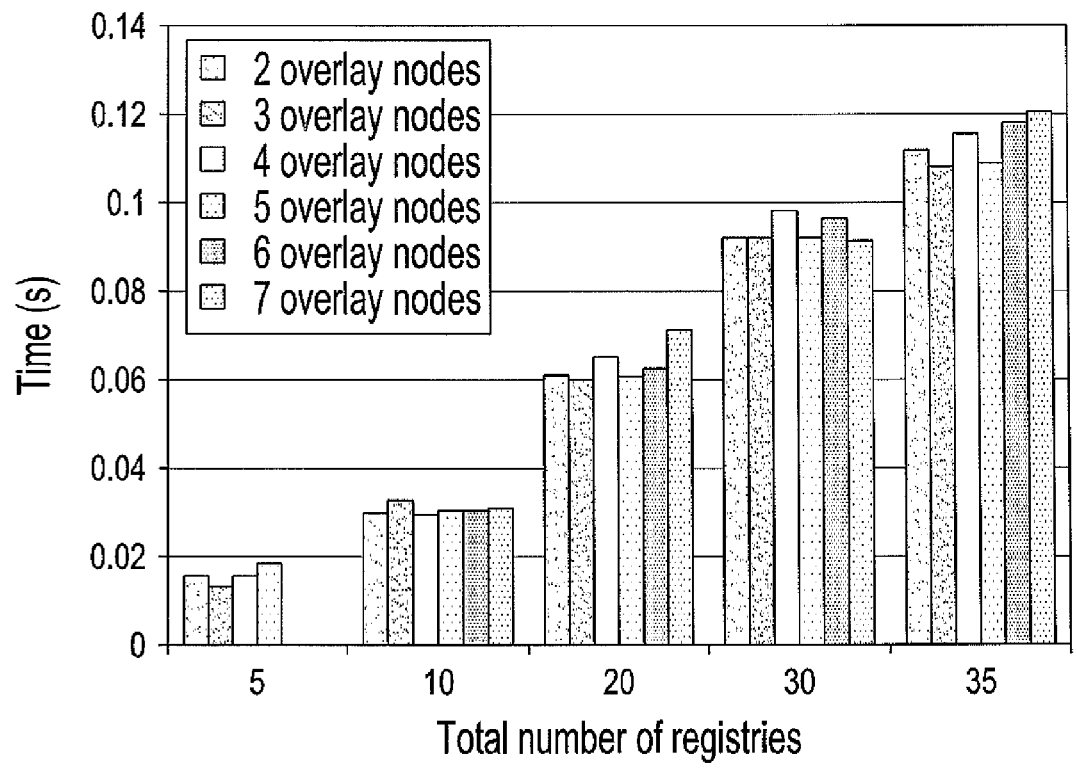

FIG. 10 illustrates the network composition model used for simulating the agreement execution aspect of these exemplary embodiments. The composed network 1000 hosts a given number of heterogeneous registries, which are organized into different multicast groups. The modeled RCE 1002 is the entity that orchestrates the creation of the registry overlay network, e.g., by activating a certain number of overlay nodes 1004 each of which are associated with a certain number of registries 1006. This simulation started with the case of two heterogeneous registries (R1 and R2), where two overlay nodes (ON1 and ON2) are needed. Then, the simulation parameters were varied, e.g., the number of registries was varied from 2 to 35 and the number of overlay nodes which were activated was varied from 2 to 7. The scalability parameters were then measured for each permutation. For example, the average message propagation time delay (seen in FIG. 11) and the total time delay required for the complete RON creation (seen in FIG. 12) vary depending on the number of registries in the network and the number of overlay nodes used. They are linearly proportional to the number of registries. However, for each different number of registries to be composed, it can be seen that there are varying differences between average propagation time delays when using different numbers of overlay nodes (e.g., for five registries, the minimum average delay is obtained for 3 overlay nodes). This same characteristic is also seen for the total time delay in FIG. 12. This information can be used by exemplary embodiments to optimally choose the number of registries to be served by the same overlay node, instead of using a single overlay node for all of the registries using the same IPDI as the overlay node, independently of their number.

Figure 13:
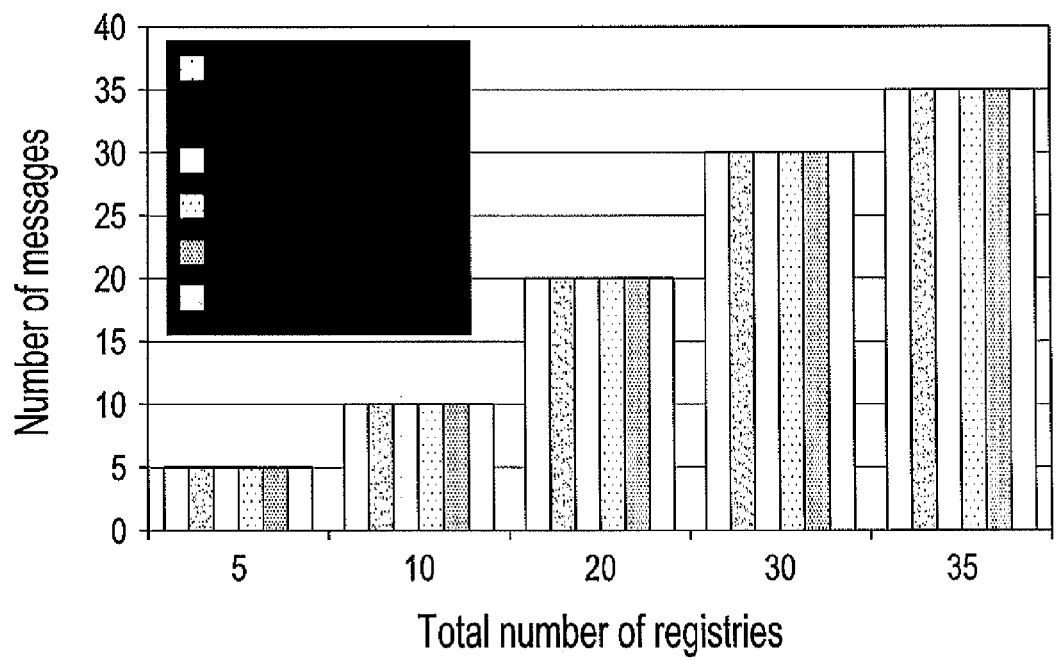

FIG. 13 shows the number (nbrmsg) of messages exchanged for agreement execution in the simulations as a function of the number of registries and the number of overlay nodes. It can be seen therein that, for each number of registries (nbrreg), nbrmsg is the same independent of the number of overlay nodes. Indeed, in each case, the RCE 1002 sends a single ActivateNode message to each overlay node 1004 (nbrovnodes), each overlay node 1004 sends nbrsame_regs ConfigOvNode messages, where nbrsame_regs is the number of registries that have the same IPDI as the overlay node. The message sent by an overlay node 1004 to itself (i.e., since the overlay node 1004 also includes its own registry) is not counted since it is not sent to the network.

Figure 14:
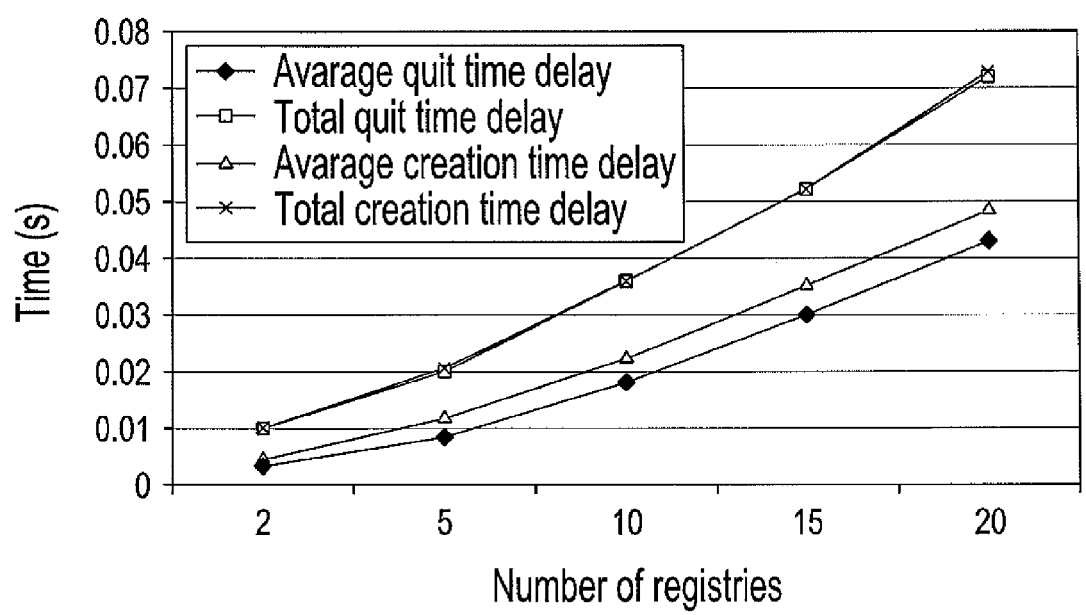

For a registry 1006 to quit a RON 1004, only one message may be used (i.e., a Quit message sent to the overlay node 1004). The quitting process is transparent to the other entities in the network (except the overlay node). When an overlay node decides to quit, more processing, messages and time are required. For example, when an overlay node 1004 quits, the RCE 1002 should replace it, which is equivalent to creating a RON with one overlay node and (nbrisame_regs-1) registries. Nbrisame_regs is the number of registries served by the quitting node, including itself. FIG. 14 shows the average propagation and total time delay for an overlay node 1004 to quit, where nbrisame_regs varies from 2 to 20, along with the average propagation and total time delay for the creation of the related RON.

Figure 15:
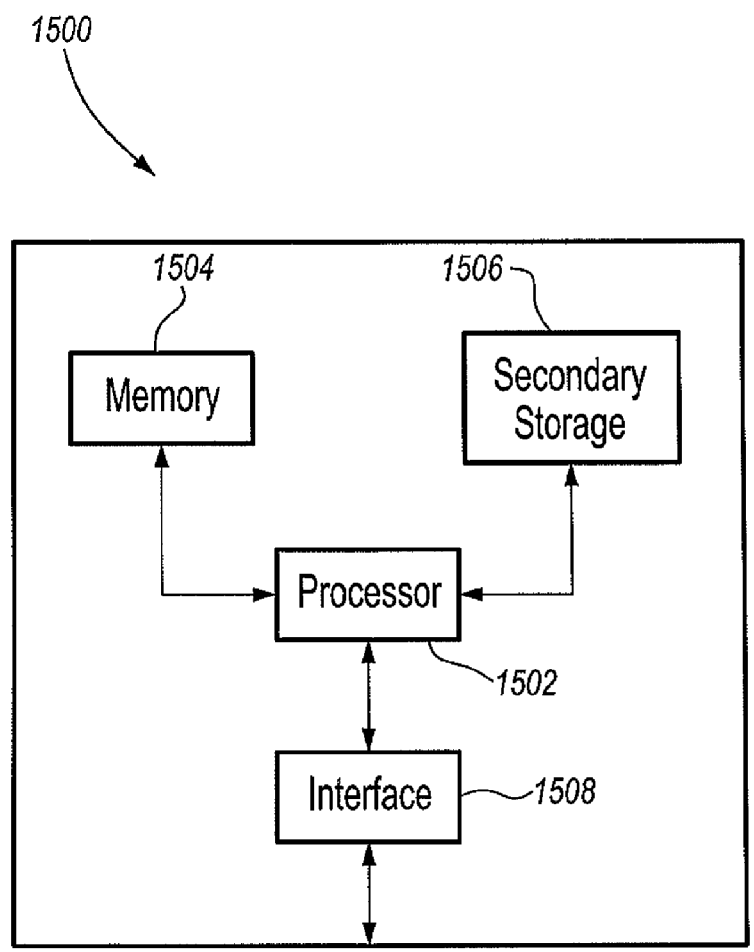
FIG. 15 illustrates an exemplary node associated with exemplary embodiments.

The foregoing exemplary embodiments describe methods, systems, devices and software for negotiating and executing registry composition. An exemplary (hardware) node 1500 which may be involved in such activities is illustrated as FIG. 15. Therein, node 1500 contains a processor 1502 (or multiple processor cores), memory 1504, one or more secondary storage devices 1506 and an interface unit 1508 to facilitate communications between node 1500 and the rest of the network, e.g., a participant node or a mediator node during the negotiation phase of network composition or an overlay node associated with execution of an agreed-to composition as described above.

Figure 16:
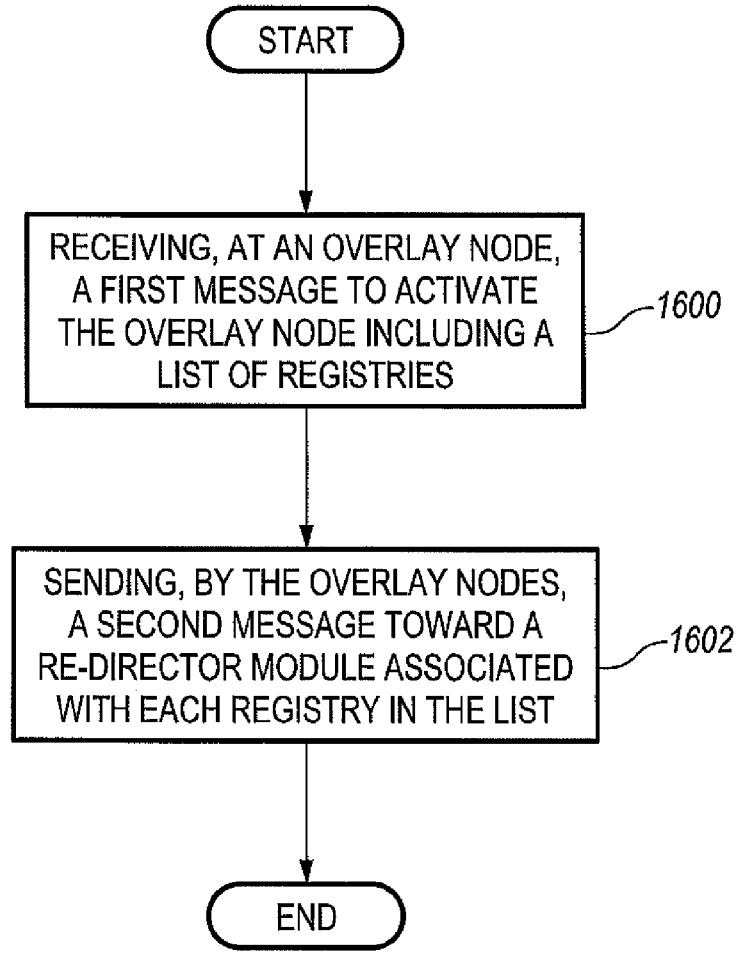
FIGS. 16 and 17 are flowcharts illustrating exemplary methods according to exemplary embodiments.

Thus, according to one exemplary embodiment, a method for executing a negotiated registry composition includes the steps shown in the flowchart of FIG. 16. Therein, at step 1600, a first message is received at an overlay node to activate that overlay node, the first message (e.g., an ActivateNode message) including a list of at least one registry that supports an interface (e.g., an IPDI) being used by the overlay node. This message may be targeted to a specific overlay node that uses this specific interface (e.g., this IPDI), which specific overlay node will be known to the RCE through previous processes associated with the network composition. The overlay node then sends, as shown in step 1602, a second message (e.g., a ConfigOvNode message) toward a re-director module of each registry in the list.

Figure 17:
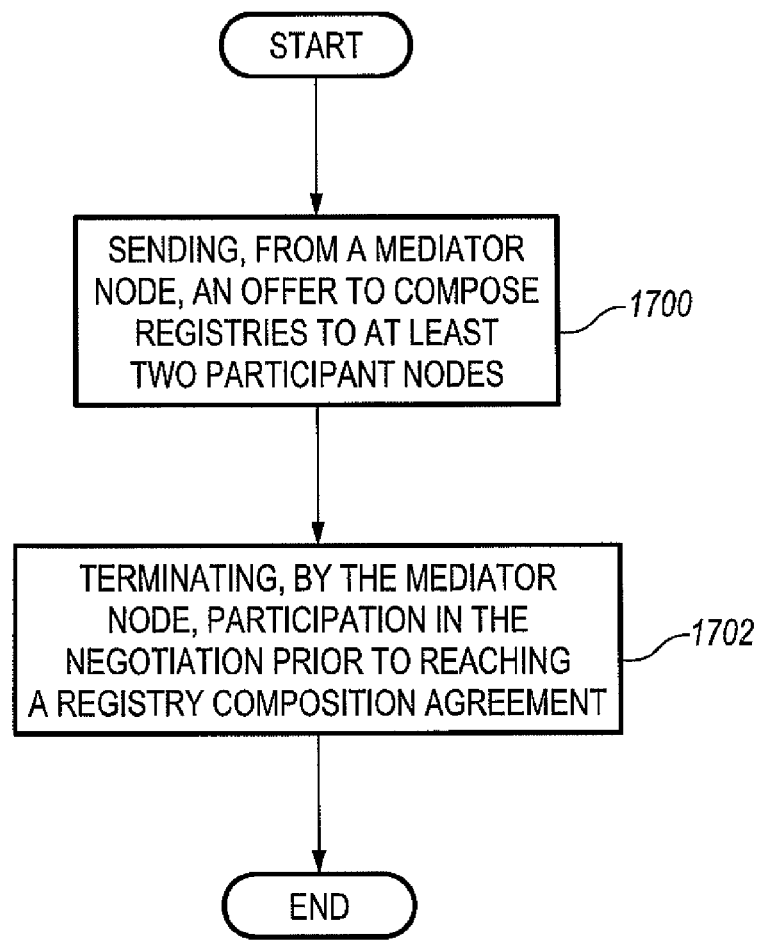

According to another exemplary embodiment, a method for negotiating registry composition when a mediator leaves an ongoing negotiation includes the steps illustrated in the flowchart of FIG. 17. Therein, an offer is sent to compose registries from a mediator node to at least two participant nodes at step 1700. Then, the mediator node terminates its participation, at step 1702, in the negotiation prior to reaching a registry composition agreement.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:
1. A method for executing a negotiated registry composition agreement, comprising:
    following negotiation of the registry composition agreement, receiving a first message at an overlay node to activate said overlay node, said first message including a list of at least one registry that supports an interface being used by said overlay node; and sending, from said overlay node, a second message toward a re-director module of each of said at least one registry in said list;

wherein said overlay node further comprises:
a signaling application, associated with a signaling layer of said overlay node, for processing said first and second messages; and
a group management module, associated with a messaging layer of said overlay node and in communication with said signaling application, said group management module including:
a create group function for creating a communication group to enable messages to be sent to a plurality of destinations;
an add member function for adding a new member to said communication group;
a remove member function for removing a member from said communication group; and
a change member function for changing an IP address associated with a member of said communication group.

2. The method of claim 1, further comprising:
receiving, at said overlay node, a third message indicating that a registry wants to quit from a composed registry associated with said overlay node.

3. The method of claim 2, further comprising:
receiving, at said overlay node, a fourth message indicating that a registry wants to rejoin said composed registry associated with said overlay node.

4. The method of claim 1, wherein said at least one registry is a database which contains data accessible by an application.

5. The method of claim 1, wherein said interface is an Information Publication and Discovery Interface (IPDI).

6. The method of claim 1, further comprising:
determining a number of overlay nodes to activate based upon a number of registries to be composed.

7. The method of claim 6 wherein the step of determining a number of overlay nodes to activate based upon a number of registries to be composed further comprising determining, for each of the registries, an interface being used thereby.

8. A method for executing a negotiated registry composition agreement, comprising:
receiving a first message at an overlay node to activate said overlay node, said first message including a list of at least one registry that supports an interface being used by said overlay; and
sending, from said overlay node, a second message toward a re-director module of each of said at least one registry in said list node
wherein said overlay node further comprises a signaling application, associated with a signaling layer of said overlay node, for processing said first and second messages and a messaging primitive module, associated with a messaging layer of said overlay node, said messaging primitive module including:
a send message primitive function for sending a message to one or more destinations including a group identification parameter and a minimum response parameter indicating a minimum number of responses; and
a receive message primitive function for processing messages received by said overlay node, and selectively passing said messages on to said signaling application when said minimum number of responses have been received.

9. A communication node comprising:
a processor for executing a negotiated registry composition agreement by receiving a first message to activate an overlay node, said first message including a list of at least one registry that supports an interface being used by said overlay node; and by sending a second message toward a re-director module of each of said at least one registry in said list;
wherein said overlay node further comprises:
a signaling application, associated with a signaling layer of said overlay node, for processing said first and second messages; and
a group management module, associated with a messaging layer of said overlay node and in communication with said signaling application, said group management module including:
a create group function for creating a communication group to enable messages to be sent to a plurality of destinations;
an add member function for adding a new member to said communication group;
a remove member function for removing a member from said communication group; and
a change member function for changing an IP address associated with a member of said communication group.

10. The communication node of claim 9, wherein said processor receives a third message indicating that a registry wants to quit from a composed registry associated with said overlay node.

11. The communication node of claim 10, wherein said processor receives a fourth message indicating that a registry wants to rejoin said composed registry associated with said overlay node.

12. The communication node of claim 9, wherein said at least one registry is a database which contains data accessible by an application.

13. The communication node of claim 9, wherein said interface is an Information Publication and Discovery Interface (IPDI).

14. A communication node comprising:
a processor for executing a negotiated registry composition agreement by receiving a first message to activate an overlay node, said first message including a list of at least one registry that supports an interface being used by said overlay node; and by sending a second message toward a re-director module of each of said at least one registry in said list;
a signaling application, associated with a signaling layer of said overlay node, for processing said first and second messages; and
a messaging primitive module, associated with a messaging layer of said overlay node, said messaging primitive module including:
a send message primitive function for sending a message to one or more destinations including a group identification parameter and a minimum response parameter indicating a minimum number of responses; and
a receive message primitive function for processing messages received by said overlay node, and selectively passing said messages on to said signaling application when said minimum number of responses have been received.

* * * * *

UNITED STATES PATENT AND TRADEMARK OFFICE
CERTIFICATE OF CORRECTION

PATENT NO. : 8,005,015 B2
APPLICATION NO. : 12/180894
DATED : August 23, 2011
INVENTOR(S) : Belqasmi et al.

It is certified that error appears in the above-identified patent and that said Letters Patent is hereby corrected as shown below:

In Fig. 2A, Sheet 2 of 16, delete "Loop until agreament" and insert -- Loop until agreement --, therefor.

In Fig. 9, Sheet 10 of 16, Line 1, delete "Avarage" and insert -- Average --, therefor.

In Fig. 14, Sheet 13 of 16, Line 1, delete "Avarage quit" and insert -- Average quit --, therefor.

In Fig. 14, Sheet 13 of 16, Line 3, delete "Avarage creation" and insert -- Average creation --, therefor.

In Column 8, Line 64, delete "theses" and insert -- these --, therefor.

In Column 17, Line 52, in Claim 8, delete "node" and insert -- node; --, therefor.

Signed and Sealed this
Twentieth Day of March, 2012

David J. Kappos
*Director of the United States Patent and Trademark Office*